United States Patent [19]
Easterly et al.

[11] 3,857,633
[45] Dec. 31, 1974

[54] PROJECTOR FUNCTION CONTROL MECHANISM

[75] Inventors: Donald O. Easterly; Donald E. Day, both of Rochester, N.Y.

[73] Assignee: Eastman Kodak Company, Rochester, N.Y.

[22] Filed: July 25, 1973

[21] Appl. No.: 382,636

[52] U.S. Cl................. 352/124, 352/157, 352/173, 352/174, 242/205, 226/49
[51] Int. Cl. .......................................... G03b 23/00
[58] Field of Search .......... 352/124, 157, 158, 159, 352/173, 174, 176, 178; 226/49, 50, 51; 242/201, 204, 205

[56] References Cited
UNITED STATES PATENTS

| | | | |
|---|---|---|---|
| 1,944,035 | 1/1934 | Proctor | 352/124 |
| 3,240,550 | 3/1966 | Mitchell | 352/124 |
| 3,439,981 | 4/1969 | Nemeth | 352/173 X |
| 3,734,602 | 5/1973 | Deck | 352/124 X |

Primary Examiner—Monroe H. Hayes
Attorney, Agent, or Firm—J. Morrow

[57] ABSTRACT

The invention concerns a mechanism for controlling the operation of a web transporting device, such as a sound motion picture projector. According to a preferred embodiment of the present invention, a single function-selection member is manually positionable for moving brake members and drive members of the projector into and out of operative positions so as to alter the mode of operation of the projector without breakage or spillage of the film. The movement of the selection lever by the operator also is effective to control a coordinating member for controlling the electric current supplied to the projector and for positioning other projector mechanisms including a pressure member for cooperating with a sound transducer of the projector, a heat absorbing member for protecting the film during still projection and a loop sensor for maintaining a desired spacing of the film along a portion of the film path of the projector.

9 Claims, 7 Drawing Figures

PATENTED DEC 31 1974

PROJECTOR FUNCTION CONTROL MECHANISM

CROSS REFERENCE TO RELATED APPLICATIONS

Reference is hereby made to commonly-assigned U.S. Pat. application Ser. No. 294,709, entitled, REEL DRIVING DEVICE FOR A WEB TRANSPORTING APPARATUS, filed Oct. 3, 1972, in the name of Donald O. Easterly; U.S. Pat. application Ser. No. 382,620, entitled, SPINDLE CONTROL MECHANISM, filed July 25, 1973, in the name of Donald E. Day; and U.S. Pat. application Ser. No. 382,621, entitled, CONTROL MECHANISM FOR A WEB TRANSPORTING DEVICE, filed July 25, 1973, in the name of Donald O. Easterly.

BACKGROUND OF THE INVENTION

1. Field Of The Invention

The present invention relates to a mechanism for a motion picture projector or other web transporting apparatus which is suitable for being positioned along a film path or into contact with the film for controlling the movement of film. More particularly, the invention is directed to a simple and reliable mechanism for controlling the mode of operation of a motion picture projector by controlling the electric current supplied to the projector and by positioning other projector apparatus.

2. Description Of The Prior Art

Modern motion picture projectors are customarily provided with a variety of function selector devices that permit the projectors to be selectively set for various modes of operation. The present invention is intended to provide a simple and highly reliable mechanism permitting ready selection of the different modes of operation of a motion picture projector through a single selection lever.

SUMMARY OF THE INVENTION

An object of the present invention is to provide a motion picture projector or other web transporting apparatus having a simple and dependable control mechanism for adjusting the machine selectively to one of a plurality of operating modes.

Another object of the invention is to provide a control mechanism for a motion picture projector that is adjustable by means of a single manually movable function selector lever which controls the operating members of the projector.

A further object of the invention is to provide a projector function control mechanism for selectively determining the mode of operation of the projector by controlling (1) the drive for advancing the film in forward or reverse direction through the projector, (2) a movable portion of a film gate for permitting a film to be received into or removed from the film gate or to be freely moved therethrough, and (3) other sound related apparatus such as a pressure member for cooperating with the sound transducer and/or loop sensors.

Briefly, these and other related objects are realized in accordance with the present invention by means of a coordinating member which cooperate with a single selection lever of a sound motion picture projector for controlling the electric current supplied to the projector and for positioning other projector mechanisms along the film path including the pressure member for cooperating with the sound transducer and/or loop sensors.

The invention and its objects and advantages will become apparent in the detailed description of the preferred embodiment presented below.

BRIEF DESCRIPTION OF THE DRAWINGS

In the detailed description of the preferred embodiments presented below, reference is made to the accompanying drawings, in which.

DESCRIPTION OF THE PREFERRED EMBODIMENTS

Because motion picture projectors and other related apparatus are well known, the following description is directed in particular to those elements forming part of or cooperating directly with the present invention. Elements not specifically shown or described herein being understood to be selectable from those known in the art.

Figure 1:
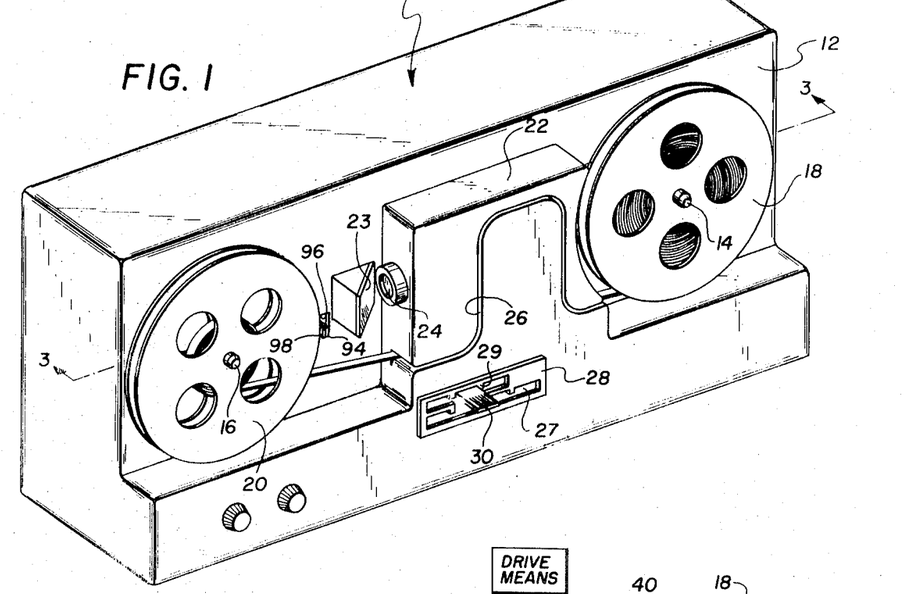
FIG. 1 is a perspective view of an illustrative motion picture projector incorporating a control mechanism according to the present invention.

Referring first to FIG. 1 of the accompanying drawings, the illustrative projector 10 comprises a box-like housing 12 for the various internal components hereinafter described. A pair of spaced film reel spindles 14 and 16 project from the housing to removably support the respective film supply and take-up reels 18 and 20 in a common plane at the opposite ends of one side of housing 12. Housing 12 includes a portion 22 that projects into the plane between the reels 18 and 20. A projection lens 24 projects from housing portion 22 and the optical axis of the lens is oriented to direct light from a lamp (not shown) onto a mirror 23. A slot in housing portion 22 defines a film path 26 which extends between the two reels, between the lamp and the projection lens 24 and through a film gate 140 (FIGS. 5 through 7) therebetween, and past a film advancing mechanism (not shown) that is located along the film path within housing portion 22.

Figure 2:
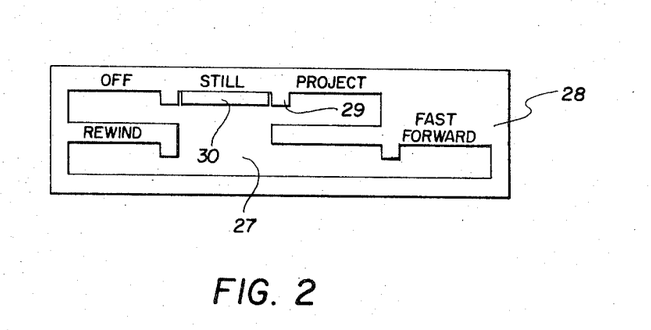
FIG. 2 is an enlarged elevation view of the selection lever of the subject projector and of the face plate illustrating various modes of operation.

The movement of the film along path 26 is controlled by the operator moving a mode selection lever 30 along a generally "H" shaped opening or slot 27 in the selection or face plate 28 to the "off," "still," "project," "rewind" or "fast forward" positions which are identified upon the enlarged view of the face plate depicted in FIG. 2. Movement of the selection lever 30 to the various operating positions affects the control mechanism of the present invention as will be discussed later in greater detail, and also controls other projection linkage as described in detail in the before-mentioned commonly assigned copending U.S. Pat. application Ser. No. 382,620, entitled, SPINDLE CONTROL MECHANISM, filed on even date herewith in the name of Donald E. Day, U.S. Pat. application Ser. No.

382,621, entitled, CONTROL MECHANISM FOR A WEB TRANSPORTING DEVICE, filed on even date herewith in the name of Donald O. Easterly. As best shown in FIG. 2, there are a plurality of downward extending protrusions such as shown at 29 along the opening 27 that separate the various operating position of lever 30 and are effective to positively maintain the selection lever 30 in the "off," "still," "project," "rewind" or "fast forward" positions once the operator has depressed the selection lever 30 against the upward urging of the spring 70 and has positioned the selection lever laterally to one of the plurality of positions to obtain the desired mode of operation of the projector.

Figure 3:
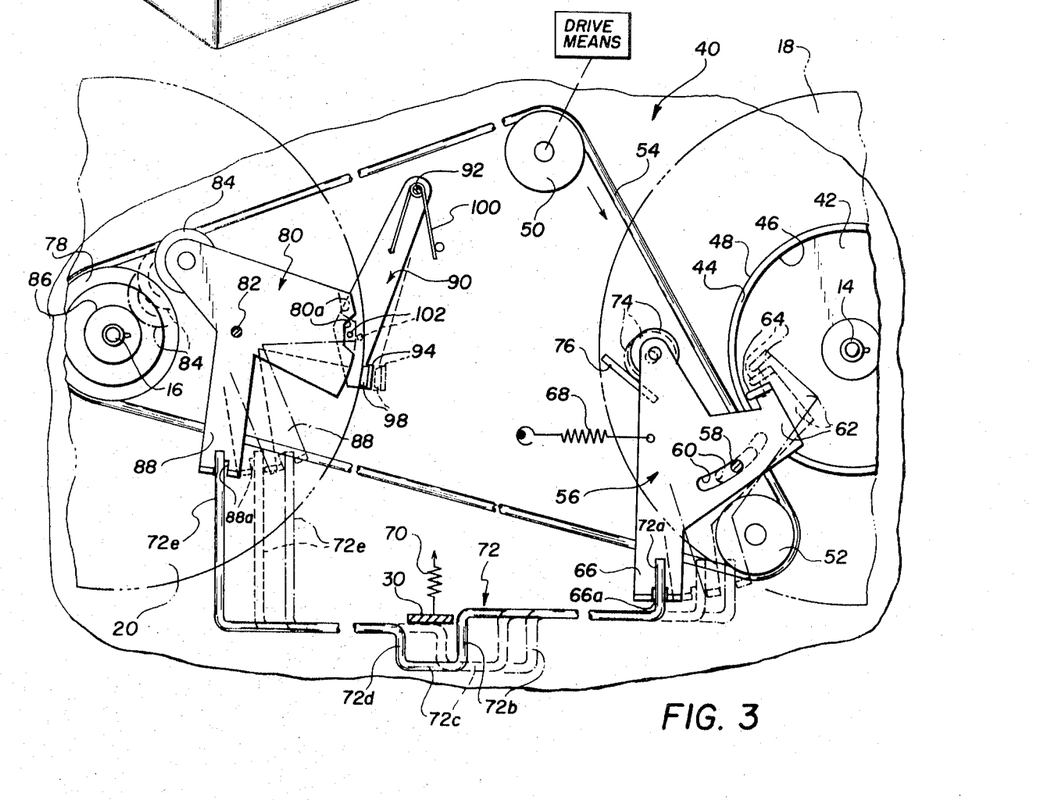
FIGS. 3 and 4 are somewhat schematic views of the clutch and brake control elements of the mechanism showing several positions of these elements positioned to effect various modes of operation.
Figure 4:
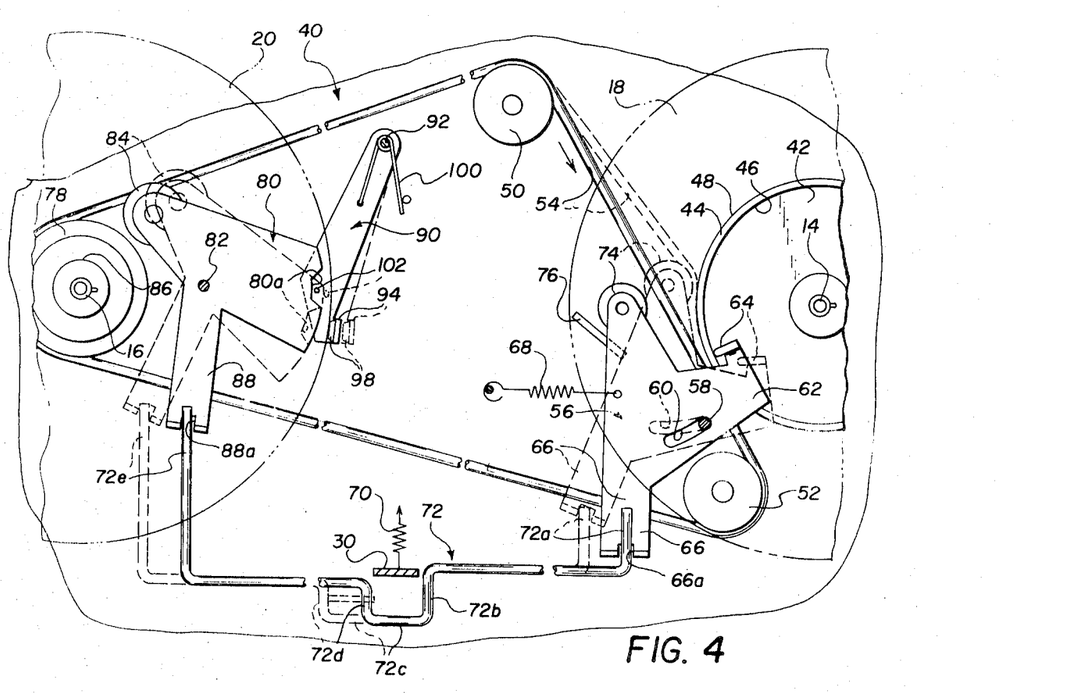

Referring now in detail to FIGS. 3 and 4, the film reel spindles 14 and 16 are rotatably supported by a frame plate 40 which is carried by the projector casing 12. Secured to spindle 14 is a drum 42 having a peripheral lip 44 that defines a cylindrical internal braking surface 46 and a cylindrical external driving surface 48. Spindle 16 is preferably a weight-sensitive type such as disclosed in the commonly assigned copending U.S. Pat. application Ser. No. 294,709, entitled, REEL DRIVING DEVICE FOR A WEB TRANSPORTING APPARATUS, filed Oct. 3, 1972 in the name of Donald O. Easterly. Secured to spindle 16 is a pulley 78 which, along with an idler pulley 52 and a drive pulley 50, carry a continuous elastic belt 54. Drive pulley 50 is driven by conventional drive means (shown schematically in FIG. 3) such that the belt 54 is driven in a clockwise direction as viewed in the drawings.

A supply reel control plate 56 is pivotally mounted to the frame plate 40 by a pivot stud 58 received in an arcuate slot 60 in the plate. Control plate 56 includes an extension 62 which supports a friction pad or brake pad 64 in position for contacting braking surface 46 to brake or retard the rotation of the drum 42. Also supported by the control plate 56 is a freely rotatable roller 74 which is located in a common plane with the belt 54 and is movable in that plane by the clockwise pivoting movement of the control plate 56 for urging the belt 54 into engagement with the driving surface 48 of drum 42 for rotatably driving the drum. Roller 74 also is energizable with a stop member 76 secured to the frame plate 40 to define a pivot for the movement of the control plate 56 when the control plate is pivoted in the counterclockwise direction. These functions of roller 74 will be explained in detail later.

As shown in FIGS. 3 and 4, selection lever 30 acts through a control rod 72 to alter the position of the control plate 56 and thereby change the operating mode of the supply spindle 14 as described in more detail in the aforementioned commonly assigned copending U.S. Pat. application Ser. No. 382,621. A first end portion 72a of a control rod 72 extends through an opening 66a in extension 66 of control plate 56 for moving the control plate through a range of positions as the rod 72 is moved by the selection lever 30. As may be seen in FIGS. 3 and 4, selection lever 30 cooperates with a generally "U-shaped" portion of a control rod 72 which is defined by vertical legs 72b, 72d and a horizontal connecting segment 72c. In the preferred embodiment, leg 72d is shorter than leg 72b such that selector lever 30 will pass over leg 72d and not cause movement of control rod 72 when the selector lever is moved upwardly and then laterally to the upper left hand position (i.e., to the "off" position) in opening 27 of the face plate 28. As will be explained later in greater detail, in the preferred embodiment the movement of the selection lever 30 from the still position to the off position is the only movement of the lever 30 which will not cause corresponding movement of control rod 72 and the associated projector mechanism.

A second end portion 72e of the control rod 72 extends through an opening 88a in an extension 88 of a control lever 80 which is pivotally mounted to the frame plate 40 by a pivot stud 82. The lateral movement of control rod 72 to the right to the "fast forward" position shown in the dotted and dashed lines in FIG. 3 causes relative pivotal movement of the control lever 80 for moving a pressure wheel 84, which is supported by the control lever 80, into radial alignment with a hub member 86 for causing spindle 16 to be driven more positively in a clockwise direction in a manner such as described in the beforementioned commonly assigned copending U.S. Pat. application Ser. No. 294,709 entitled, REEL DRIVING DEVICE FOR A WEB TRANSPORTING APPARATUS, filed Oct. 3, 1972, in the name of Donald O. Easterly, which is incorporated herein by reference. The radial force or load exerted on spindle 16 by the pressure wheel 84 is substantially greater than the force attributed to the weight of reel 20 and the film which may be wound thereon and it increases the friction between clutch elements of the spindle 16, thereby increasing the torque transmission to the spindle. Movement of the control rod 72 by the operator is also effective to control the operation of the take-up spindle 16 by causing braking of the spindle as will be described now.

A brake lever 90 is pivotally supported to the frame plate 40 by a pivot stud 92. Brake lever 90 includes a finger-like member 94 that extends through a slot 96 in the housing 12 adjacent the rim of the take-up reel 20 as illustrated in FIG. 1. A friction pad 98 is carried by finger 94 in edgewise alignment with the peripheral edge of the inner flange of reel 20. A hairpin spring 100 urges the brake lever in a clockwise direction around stud 92 to urge the friction pad toward the reel. A cam follower 102 on the brake lever 90 is aligned with a notch-like cam surface 80a of the take-up reel control lever 80. A portion of cam surface 80a is indented such that friction pad 98 engages reel 20, under the influence of spring 100, whenever cam follower 102 is received in the indented portion, and when the follower 102 is removed from the indented portion the friction pad is restrained from engaging the reel.

Because of the relative placements of stud 92, the pressure pad 98 and the take-up reel 20, the braking action between the pad 98 and the reel 20 tends to be self-energizing whenever the brake pad is brought into engagement with the reel as the reel is being driven in the counterclockwise or film rewinding direction. That is, as the friction pad 98 is urged into peripheral engagement with the reel 20 while it is being rotatably driven in the counterclockwise direction, the pad tends to be urged more firmly into contact with the edge of flange of the reel 20. The faster the reel is turning in the counterclockwise direction, the greater is the tendency of the reel to urge or pull the pad into contact with the flange itself and thereby create a greater braking force between the reel and the pad. When the reel 20 is driven in the clockwise direction during the project or fast forward mode of operation, the force of hairspring 100 is the only effective force which applies braking force to the reel 20 for the rotation of the reel 20 tends to urge the brake pad 98 away from the reel instead of urging the brake pad 98 into engagement with the reel. Thus, it is realized that the self-energizing feature which tends to increase the braking effectiveness is a function of both the direction of rotation and the speed of rotation of the reel.

Referring now specifically to FIG. 3, control lever 30 is shown in solid lines as it would be positioned for the still mode of operation wherein control rod 72, plate 56 and lever 80 are positioned by the lever 30 such that brake pad 64 is fully in engagement with braking surface 46 and friction pad 98 is in engagement with reel 20. In the still position, both the supply reel 18 and the take-up reel 20 are thereby inhibited from rotating by this braking action and a single image frame of the film can then be projected.

If the operator shifts the selection lever 30 from the still position shown in solid in FIG. 3 to the project mode of operation, the movement of lever 30 moves control rod 72 to the right (to the middle position shown in phantom in dashed lines in FIG. 3). This movement of the control rod 72 rotates the control plate 56 in a counterclockwise direction about pivot stud 58 against the urging of spring member 68, wherein friction pad 64 is removed from contact with braking surface 44 of drum 42, thereby conditioning the spindle for a free-wheeling mode of operation and permitting the film to be freely removed from the supply reel 18. At the same time, this movement of control rod 72 also causes control lever 80 to be pivoted in a counterclockwise direction around pivot stud 82, thereby causing cam follower 102 to ride up a ramp on cam surface 80a and be removed from the indented portion of the cam surface. This removes friction pad 98 from contact with the peripheral surface of reel 20 so that reel 20 can be rotatably driven by the weight sensitive spindle 16. When the projector is in the project mode as described above, the pressure wheel 84 remains a spaced distance from hub member 86 (as indicated in phantom in dashed lines in FIG. 3) such that the reel 20 is driven through the force applied by the spindle which results from the weight of the reel and film alone.

To terminate the project mode of operation, the operator must depress lever 30 slightly so that it can be moved under the protrusion 29 of the frame plate 28 and then the operator can move the lever horizontally to the left toward the still position shown as a solid line in FIG. 3 wherein spring member 68 again returns control plate 56 in the clockwise direction about the pivot stud 58 to the braking position wherein brake pad 64 is initially moved into engagement with braking surface 46 as previously described. Continued movement of rod 72 results in control plate 56 pivoting about the brake pad 64 with the arcuate opening 60 being slid along the pivot stud 58 while spring 68 continues to maintain brake pad 64 in braking engagement with braking surface 46. Through the control rod 72, the control lever 80 is sequentially returned in the clockwise direction about pivot stud 82 to the position wherein the cam follower 102 passes into the indented portion of cam surface 80a allowing friction pad 97 to again contact reel 20. In the preferred embodiment of the projector shown, the shape and position of the cam surface 80 a is such that this movement of the control rod 72 is effective first to initiate braking of the supply spindle 18 through brake pad 64 acting with braking surface 46 and then to subsequently initiate braking of the take-up reel 20 by the friction pad 98. This sequential braking feature results in a braking force being applied to the supply spindle first and then to the take-up reel so as to effectively eliminate "spilling" of the film from supply roll due to inertia of the roll.

If the operator were then to move the selection lever 30 downward from the still position, against the urging of the spring 70, lever 30 then can be shifted horizontally along the lower opening in control plate 28 to either the fast forward or rewind positions. Moving the selectionlever 30 to the lower right-hand position (into the fast forward position shown in phantom in dot and dashed lines in FIG. 3) causes movement of control plate 56 and control lever 80 further in the counterclockwise direction than previously described for the project mode of operation and thereby additionally causes pressure wheel 84 to apply a radial force to the hub member 86 of the weight sensitive take-up spindle for causing a faster rotation by the spindle 16. As previously described in more detail in the before-mentioned commonly-assigned copending U.S. Pat. application Ser. No. 294,709 entitled REEL DRIVING DEVICE FOR A WEB TRANSPORTING APPARATUS, filed Oct. 3, 1972 in the name of Donald O. Easterly, the radial force applied to the hub member 86 effects a more positive drive of the spindle 16 than provided by the weight of the reel and the film upon the spindle 16. The continued rotation of control plate 56 causes rotatable drive roller 74 to be urged into a contact with a stop member 76 which is secured to the frame plate 40 such that control plate 56 then pivots about stop member 76 until the left end of the arcuate slot 60 is positioned near the pivot stud 58. This is the position shown in phantom at the upper right in FIG. 3. If the operator then moves the selection lever 80 from the fast forward position to the left and once again into the still position, spring 68 urges control plate 56 in a counterclockwise direction such that brake pad 64 engages braking surface 46 for braking reel 18 and the control rod 72 urges control lever 80 to also return counterclockwise direction toward the still position causing braking of reel 20, such braking occurring sequentially as previously described. When in the still position as shown in solid in FIGS. 3 and 4, the pivot stud is at or near the right end of the arcuate opening 60.

Referring now specifically to FIG. 4, if the operator has depressed the selection lever 30 and moved the lever horizontally to the left from the still position (shown in solid lines) to the rewind position (shown in phantom in dashed lines) control lever 80 and control plate 56 are rotated in a clockwise direction by the control rod 72. The rotation of control lever 80 in this direction restrains pressure wheel 84 from contacting the hub member 86 and causes cam follower 102 to be removed from the indented portion of cam surface 80a resulting in friction pad 94 being removed from contact with the reel 20. The rotation of control plate 56 about the pivot stud 60 releases the brake pad 64 from the braking surface 46 to permit reel 18 to be driven and causes the idler roller 74, which is supported by control plate 56, to urge belt 54 into resilient driving contact with the drive surface 48 on spindle 14 for driving the spindle in a counterclockwise direction as is described in the before-mentioned commonly-assigned corresponding U.S. Pat. application Ser. No. 382,620, entitled SPINDLE CONTROL MECHANISM, filed July 25, 1973, in the name of Donald E. Day.

When the operator depresses the shift lever 30 below the protrusion and returns the lever to the right to remove the projector from the rewind mode of operation, control rod 72 urges both control lever 80 and control plate 56 in a counterclockwise direction. The movement of control lever 80 in this direction causes cam follower 102 to return to the indented portion of cam surface 80a resulting in friction pad 94 returning into contact with reel 20 and removing idler roller 74 from contact with belt 54. In the preferred embodiment of the present invention, the indentation in cam 80a is positioned such that movement of the control rod 72 to the right toward the still position (shown in solid lines) results in the braking of reel 20 by the friction pad 98 slightly in advance to the engagement of braking surface 46 with the brake pad 64. Also, as previously described, the self-energizing feature of the friction pad 94 results in increasing braking force being applied to the reel 20 so as to prevent the spilling of the film from the take-up reel 20 as the projector is removed from the rewind mode of operation.

Figures 5, 6:
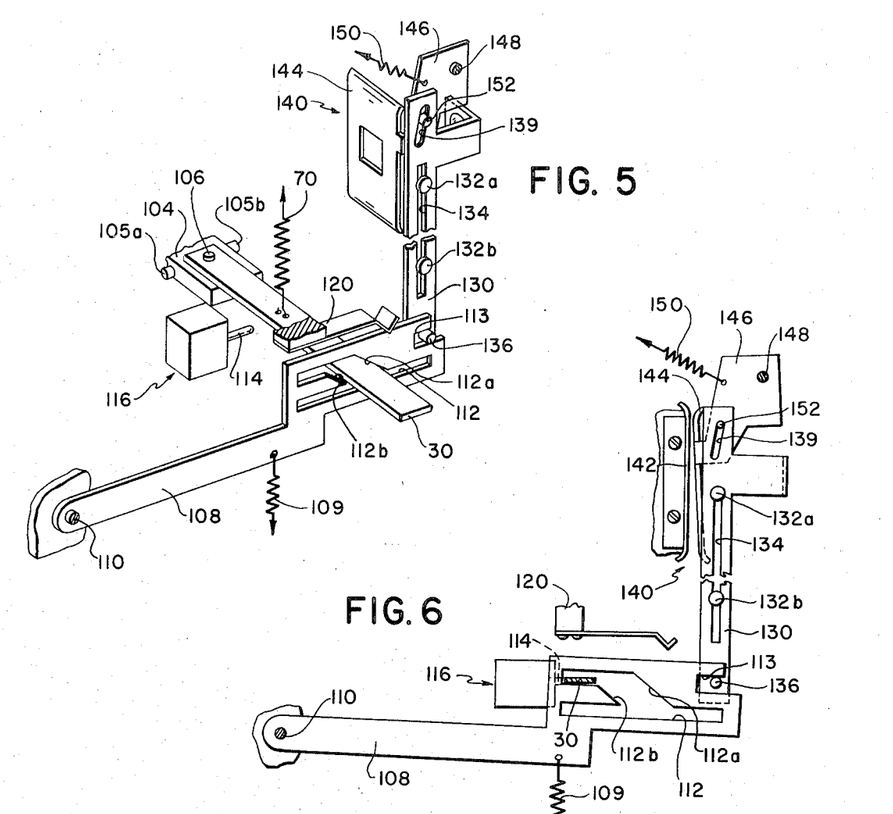
FIGS. 5 through 7 are perspective and elevation views of the coordinating mechanism that is associated with the function selector member of the subject mechanism to coordinate the reel driving and braking functions with the operation of generally conventional projector components.
Figure 7:
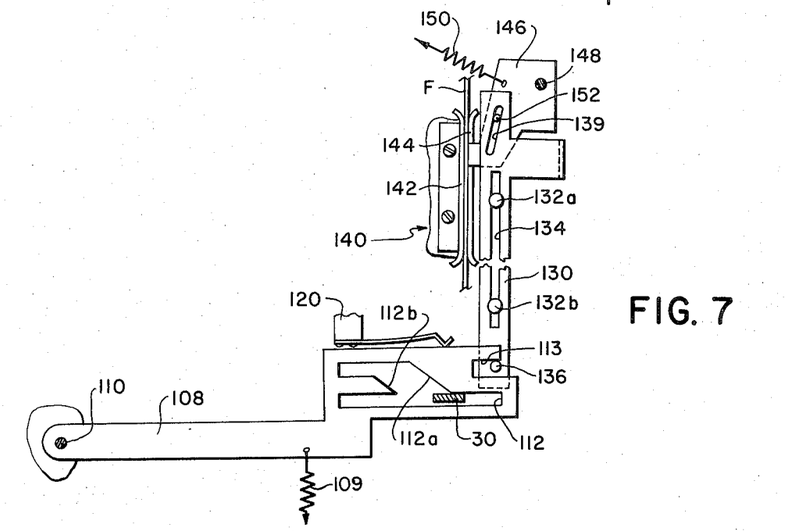

The foregoing discussion of the motion picture projector mechanisms shown in FIGS. 1 through 4 has been specifically limited to those mechanisms which have been disclosed and claimed in the before-mentioned commonly assigned corresponding U.S. Pat. application Ser. Nos. 382,620 and 382,621. The following discussion will now be primarily concerned with a preferred embodiment of the present invention which is illustrated in FIGS. 5 through 7. As will be described, this embodiment is suitable for cooperating with the previously described portions of the projector and for further controlling the operation of other projector apparatus.

In the preferred embodiment shown in FIGS. 5 through 7, the selection lever 30 is mounted to the projector housing such that it can be readily moved in both horizontal or vertical directions through the opening 27 in the face plate 28 for controlling the driving and braking of the spindles and reels as previously described and also for controlling other projector apparatus as will be described now. As illustrated, the selection lever 30 is loosely secured to a mounting plate 104 by a rivet 106 and mounting plate 104 is in turn pivotally secured to the projector housing by pivot pins 105a and 105b. The axes of rivet 106 and pins 105a, 105b are substantially perpendicular to each other to permit both sideways and up-and-down movement of lever 30. Of course, selection lever 30 can be secured to the projector housing by other suitable means.

A coordinating plate 108 is positioned immediately behind the face plate 28 and is pivotally supported at one end of the projector housing through a rivet 110. As shown in FIGS. 5 through 7, the selection lever 30 passes through an irregularly shaped opening 112 in the coordinating plate 108 and cooperates with the edges of the opening 112 for shifting the coordinating plate 108 between the "open" and "closed" positions shown in FIGS. 6 and 7, respectively, wherein the coordinating plate 108 and the selection lever 30 are effective to cooperate with other projector mechanisms to further control the operation of the projector. A spring 109 normally urges the coordinating plate 108 in a clockwise direction about rivet 110 toward the open position shown in FIG. 6. The force exerted by the spring 109 is preferably slight, being only sufficient enough to maintain the coordinating plate 108 in the open (FIG. 6) position until the coordinating plate 108 is moved in a counterclockwise direction by the selection lever as will be described.

As viewed in the drawings, the left-hand and the lower right-hand portion of the opening 112 in the coordinating plate 108 resembles and generally corresponds to the left-hand and lower right-hand portion of the opening 27 in the face plate 28 (see FIG. 2). Because of the corresponding shape between the opening 112 in the coordinating plate 108 and the opening 27 of the face plate 28, positioning of the selection lever 30 to the upper left-hand (off) position as shown in solid in FIG. 6, the lower left-hand (rewind) position, the lower right-hand (fast forward) position, or a depressed position wherein the selection lever is directly under the center (still) position and is ready to be moved horizontally to either the lower left-hand (rewind) position or the lower right-hand (fast forward) position results in the coordinating plate 108 being maintained in the open position shown in FIG. 6 as the contact between the selection lever 30 and the edges of the opening 112 is not sufficient to overcome the force exerted by spring 109. As will be explained in greater detail, the maintaining of the coordinating plate 108 in this open (FIG. 6) position opens the film gate 140 and restrains other portions of the projector in position to permit a film strip to be received into the projector or to be removed and also to permit a received film strip to be readily moved through the projector. Also, as shown in FIG. 6, when the selection lever 30 is moved to the upper left-hand (off) position, the lever contacts the plunger 114 of the normally closed switch 116 and depresses the plunger 114 to open the switch and interrupt the flow of electrical current to the drive means of the projector and also to the projection lamp. Thus, when the selection lever 30 is in the off position, the current to the projector is effectively turned off by the lever and the film is restrained in this position through the braking of the spindles 18 and 20 as was described earlier.

Referring now in detail to the central portion of the opening 112 in the coordinating plate 108, it will be seen that the opening includes a diagonal portion defined by the cam or ramp members 112a and 112b which run diagonally from the upper portion of the opening 112 to the lower portion of the opening 112. In operation of the projector, the selection lever 30 can cooperate with either the ramp members 112a and 112b to shift the coordinating plate 108 between the positions shown in FIGS. 6 and 7. For example, when the selection lever 30 is moved to the upper right-hand (project) position and to the center, the lever slidingly contacts the ramp portion 112a and cooperates therewith to pivot the coordinating plate 108 in a counterclockwise direction about rivet 110 against the urging of spring 109. Similarly, movement of the selection lever 30 to the upper left-hand (off) position results in lever 30 cooperating with the ramp portion 112b to assist the spring 109 in returning coordinating plate 108 in a clockwise direction about rivet 110 to the open (FIG. 6) position as will be discussed further. In operation of the preferred embodiment, movement of the coordinating plate 108 in the counterclockwise direction toward the closed (FIG. 7) position by movement of the selection lever 30 to either the center (still) position or to the upper right-hand (project) position, controls other portions of the projector apparatus as now will be described.

The counterclockwise movement of the coordinating plate 108 also results in the closing of a normally open switch 120 which is secured to the projector housing in position such that it is contacted by a portion of the coordinating plate 108 as the plate is moved to the closed position. When the switch 120 is thus closed, the resulting flow of electrical current energizes the projection lamp such that projection of image frames is permitted by the projector. When the selection lever 30 is moved to the left toward the off position from the project position and through the still position, the lever 30 contacts the cam or ramp portion 112b and urges the coordinating plate 108 in the clockwise direction about the rivet 110 urging the coordinating plate 108 to return the open (FIG. 6) position. Similarly, movement of the selection lever 30 from the project position downward to a depressed position directly under the center (still) position to the rewind position results in the selection lever 30 contacting the bottom surface of the opening 112 and the downward movement of the selection lever 30 also urges the coordinating plate 108 downward such that it resumes the open (FIG. 6) position.

A vertical slide bar 130 is affixed to the projection housing through pins 132a and 132b which are positioned in the elongate opening 134 in the slide bar and slidingly cooperate therewith in a pin-and-slot relationship. Affixed to the lower end of the slide bar 130 is a post 136 which is received into a recess 113 which in the end of the coordinating plate 108 opposed to pivot 110. The vertical slide bar 130 is movable in the vertical direction through the post 136 applying force to the edges of the recess 113 as the coordinating plate 108 is pivoted between the open (FIG. 6) position and the closed (FIG. 7) position. This resulting vertical movement of the vertical slide bar 130 is effective for controlling other projector apparatus which is linked to the slide bar 130 in a manner which will be described now. It should be noted that when the coordinating plate 108 is urged toward the open (FIG. 6) position by the spring 109, the coordinating plate is restrained from further travel about the rivet 110 by the cooperation of the post 136 and the recess 113 when the vertical slide bar 130 has reached the end of the travel of the elongate opening 134 relative to the pin 134a.

As shown in FIGS. 5 through 7, a film gate 140 receives a film strip F (FIG. 7) between a fixed gate member 142, which is affixed to the projector housing adjacent to the film path 26, and a movable gate member 144 such that the film strip is resiliently guided along the film path 26. While the fixed gate member 142 is affixed to the projector housing, the movable gate member 144 is pivotally supported for movement into and out of a position adjacent to the fixed member for guiding the film. In the preferred embodiment, a pivot pin 148 passes through a support portion 146 which extends from the movable gate member 144 in a plane which is perpendicular to the film plane between the fixed and movable gate members. A spring 150, which is secured between the support portion 146 and the projector housing, urges the movable gate member 144 in a clockwise direction about the pivot pin 148, toward the closed position illustrated in FIG. 7 wherein the film strip is resiliently engaged in the space defined between the fixed and movable gate members 142 and 144, when the selection lever 30 is positioned in the position for the still mode of operation or in the position for the project mode of operation.

As illustrated in FIG. 6, when the selection lever 30 is moved to the off, rewind or fast forward position, the movable film gate 144 is pivoted in a counterclockwise direction about the pivot pin 148 through the cooperation of pin 152 which is affixed to the support portion 146 with the edge of an elongate opening 139 which is angularly inclined near the upper end of the vertical slide bar 130. The counterclockwise movement of the movable gate member 144, which results from the movement of the selection lever 30 is effective to separate the gate members 142 and 144 by a spaced distance such that the film F can be readily inserted therebetween as the film is not being projected and does not require the resilient guiding of the gate members 142 and 144.

In a similar manner, other related projector apparatus can be operatively coupled to the coordinating plate 108 and the vertical slide bar 130 such that movement of the coordinating plate 108 and/or the vertical slide bar 130 results in corresponding movement of the related apparatus. For example, sound apparatus such as a sound transducer or a pressure member for cooperating with the sound transducer and/or a loop sensor for regulating the movement of film between the transducer and the film gate can be incorporated in projectors adapted for sound films and, if desired, a screen or optical bar of a well known heat absorbing type can be coupled to the mechanism such that they are shifted along the optical axis when the selection lever 30 is positioned for the still mode of operation to thereby prevent the film from being harmed through the heat reaching the stopped film.

While the invention has been described in detail with particular reference to a preferred embodiment thereof, it will be understood that variations and modifications can be effected within the spirit and scope of the invention.

I claim:

1. For a motion picture projector having (1) a light source for projecting images from a received film material, (2) electric drive means for advancing said film material through the projector and (3) a selection lever movable to a plurality of positions to select the mode of operation of the projector from a plurality of modes including off, still, project, rewind and fast forward the improvement comprising:

a. a coordinating plate pivotally supported by said projector, said coordinating plate including an irregularly shaped opening defined by a plurality of edges, said opening being adapted to receive said selection lever which cooperates with different ones of said plurality of edges for moving said coordinating plate between (1) a first position when said selection lever is moved to said position for selecting said project and said still modes of operation and (2) a second position when said selection lever is moved to the position for selecting said off, rewind or fast forward modes of operation;

b. a film gate comprising a first portion and a second portion, said second portion being movable relative to said first portion between (1) an open position wherein it is spaced from said first portion to permit said film material to be readily inserted between or removed from between said first portion and said second portion or to permit said film material to be readily moved therebetween, and (2) a closed position wherein said second portion is moved closely adjacent to said first portion such that said received film material is movable along an essentially flat plane defined therebetween to permit projection of images from said film material; and c. linkage means operatively coupling said coordinating plate and said second portion of said film gate such that when said coordinating plate is moved by said selection lever to its first position, said second portion of said film gate is moved to its closed position and when said coordinating plate is moved by said selection lever to its second position, said second portion of said film gate is moved to its open position.

2. The improvement as set forth in claim 1 further comprising an electric switch supported by said projector such that movement of said selection lever to the position for selecting said still, project or rewind mode of operation is effective to open said electric switch for energizing said electric drive means and movement of said selection lever to the position for selecting said off mode of operation is effective to de-energize said electric drive means.

3. The improvement as set forth in claim 1 further comprising means for selectively energizing and de-energizing said light source, said means being supported by said projector and being operatively coupled to said coordinating plate such that when said coordinating plate is moved toward its first position said means energizes said light source and when said coordinating plate is in its second position said means deenergizes said light source.

4. The improvement as set forth in claim 1 wherein said linkage means comprises a slide bar movably supported by the projector, means coupling one end portion of said slide bar to said coordinating plate, and means coupling the other end portion of said slide bar to said second portion of said film gate to effect pivotal movement of said second portion of said film gate in response to movement of said slide bar.

5. For a motion picture projector having (1) a light source for projecting images from a received film material, (2) an electric drive means, (3) a first rotatable spindle adapted to receive a roll of film material, said spindle including a rotatable drum portion, (4) a second rotatable spindle for winding said film material into a roll, said second spindle being supported by said projector at a spaced distance from said first spindle, (5) first and second drive means operatively coupled to said electric drive means for selectively cooperating with said first and second spindles respectively for rotatably driving said spindles, (6) first and second brake means for selectively cooperating with said first and second spindles respectively for braking rotation thereof, and (7) control means operatively coupled to said first and second drive means for controlling said drive means and operatively coupled to said first and second brake means for controlling said brake means such that said motion picture projector can be operated at a plurality of modes of operation, the improvement comprising:

a. a control plate supported by said motion picture projector, said control plate including an irregularly shaped opening defined by a plurality of edges, said opening being adapted to receive said control means which is suitable for cooperating with different ones of said plurality of edges for maintaining said control plate in either (1) an open or (2) a closed position;

b. a film gate supported by said projector comprising a first portion and a second portion, said second portion being movable relative to the first portion between (1) an open position wherein it is spaced from said first portion to permit said film material to be readily inserted between or removed from between said first and second portions or to permit said film material to be readily moved therebetween and (2) a closed position wherein said second portion is closely adjacent to said first portion such that a received film material is urged into an essentially flat plane defined therebetween for projection of images from the film material; and c. linkage means connecting said control plate and said second portion of said film gate such that when said control plate is moved to its open position, said second portion of said film gate is moved to its open position, and when said control plate is moved to its closed position, said second portion of said film gate is moved to its closed position.

6. The improvement as set forth in claim 5 further comprising an electric switch supported by said projector such that movement of said control means is selectively effective to open and close said electric switch for energizing and de-energizing said electric drive means for different modes of operation.

7. The improvement as set forth in claim 5 further comprising means for selectively energizing and de-energizing said light source, said means being supported by said projector and being operatively coupled to said control plate such that when said control plate is in its open position said means de-energizes said light source and when said control plate is in its closed position said means energize said light source.

8. In a motion picture projector having (1) first and second spindles rotatably supported by said projector, said spindles being suitable for winding and unwinding a received filmstrip which is transported therebetween, (2) first driving means and first braking means supported by said projector for controlling the driving and braking of said first spindle, (3) second driving and second braking means supported by said projector for controlling the driving and braking of said second spindle, and (4) control means for moving said first and second braking means between a first condition wherein said first braking means brakes rotation of said first spindle sequentially before the braking of the rotation of the second spindle by said second braking means and a second condition wherein said second braking means brakes rotation of said second spindle sequentially before the braking of the rotation of the first spindle by said first braking means, the improvement comprising:

a. a control plate supported by said motion picture projector, said control plate including an irregularly shaped opening defined by a plurality of edges, said opening being adapted to receive said control means which is suitable for cooperating with different ones of said plurality of edges for maintaining said control plate in either (1) an open or (2) a closed position;

b. a film gate supported by said projector comprising a fixed portion and a movable portion, said movable portion being movable between (1) an open position wherein it is spaced from said fixed portion to permit said film material to be readily inserted between or removed from between said movable and said fixed portion or to permit said film material to be readily moved therebetween and (2) a closed position wherein said movable portion is closely adjacent to said fixed portion such that a received film material is urged into an essentially flat plane defined therebetween for projection of images from the film material; and c. linkage means connecting said control plate and said movable portion of said film gate such that when said control plate is moved to its open position, said movable portion of said film gate is moved to its open position, and when said control plate is moved to its closed position, said movable portion of said film gate is moved to its closed position.

9. In a projector as set forth in claim 8 wherein said linkage means comprises a slide bar movably supported by the projector, means coupling one end portion of said slide bar to said control plate, and means coupling the other end portion of said slide bar to said movable portion of said film gate to effect pivotal movement of said movable portion of said film gate in response to movement of said slide bar.

* * * * *